Dec. 31, 1968 A. BOPP ET AL 3,419,681
METHOD AND APPARATUS FOR EQUALIZING TIMING ERRORS IN SIGNALS CONTAINING PERIODIC COMPONENTS
Filed March 16, 1965
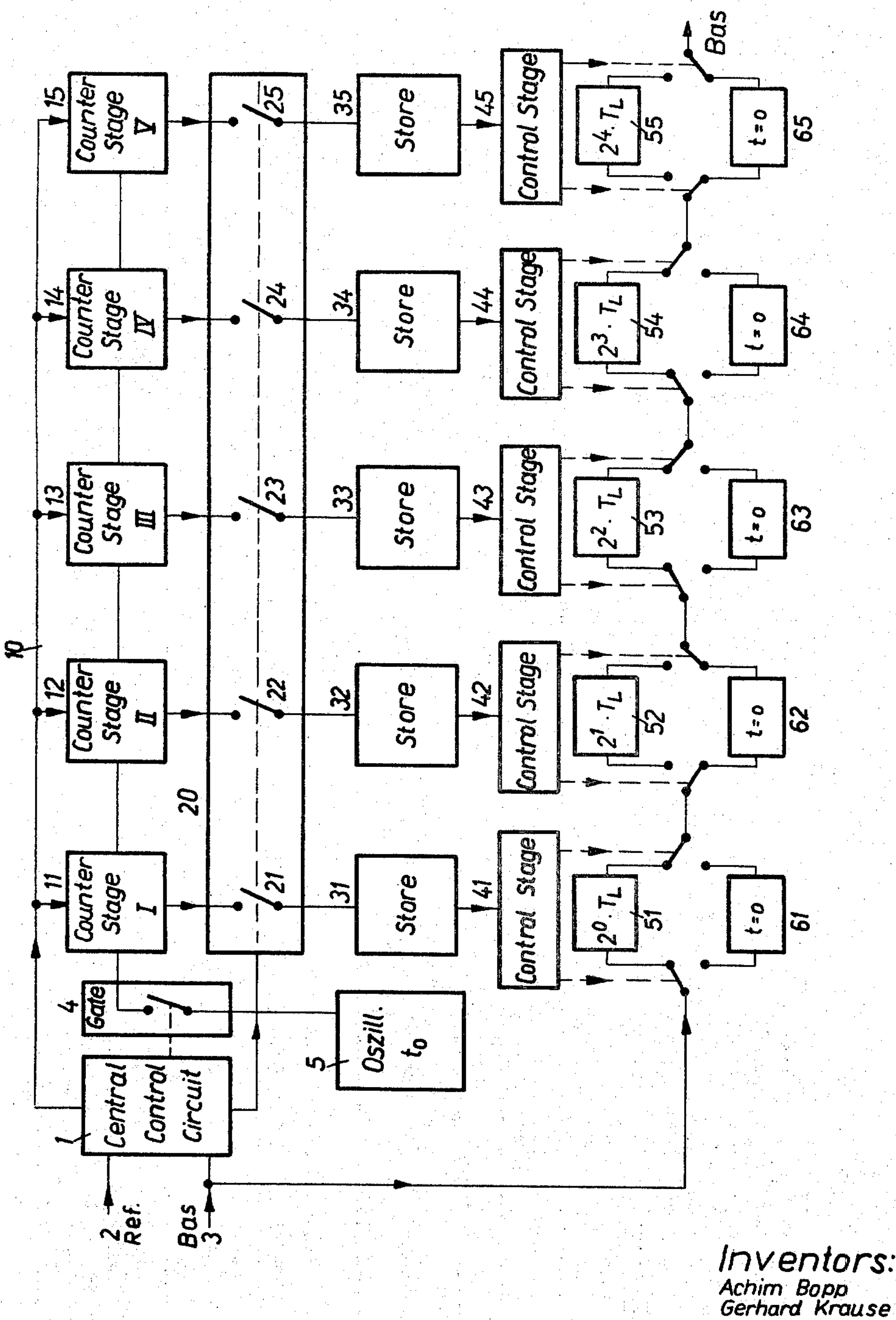
Inventors:
Achim Bopp
Gerhard Krause
by Michael J. Striker
attorney 3,419,681

METHOD AND APPARATUS FOR EQUALIZING TIMING ERRORS IN SIGNALS CONTAINING PERIODIC COMPONENTS

Achim Bopp, Furtwangen, and Gerhard Krause, Darmstadt, Germany, assignors to Fernseh G.m.b.H., Darmstadt, Germany Filed Mar. 16, 1965, Ser. No. 440,240
Claims priority, application Germany, Mar. 24, 1964, F 42,406
7 Claims. (Cl. 178—69.5)

ABSTRACT OF THE DISCLOSURE

An arrangement for equalizing and correcting timing errors in signals containing periodic components as in television signals. The signal containing the repetitive or periodic components is compared in a digital comparator with a reference signal which has periodic components precisely spaced from each other uniformly in time. A comparator develops an error signal in digital form, indicative of the timing error in the original signal. This timing error is an indication of the variation of the period between successive components in the original signal. The original signal is applied to a variable delay in the form of a multistage counter circuit, and the delay is controlled in magnitude by the digital error signal. The control of the delay is such that the timing errors in the original signal becomes equalized or corrected so that a uniform period between successive components is attained.

This invention relates to method and apparatus for equalizing timing errors in signals containing periodic components, such as television signals and has particular application in apparatus for reproducing television or like signals recorded upon magnetic tape, in which timing errors in the reproduced signal are equalized by varying the signal delay under the control of an error signal derived by comparison of a signal component in the reproduced signal with a reference signal.

In apparatus for the magnetic recording of television signals it is already known that the residual timing errors which cannot be abolished by mechanical control devices, can be reduced or compensated by alteration of the signal delay time. For this purpose, television signals taken from a magnetic store are applied to a delay line having a variable delay time, which is controlled by means of an error signal derived by comparison of the timing of the synchronizing component of the reproduced television signal with that of a synchronizing signal of constant frequency derived from a master impulse generator.

Hitherto there have been used for producing variable delay of the television signal delay lines in which the delay time has been altered by influencing the capacitive or inductive members by means of the control voltage. As a rule the capacitances of the delay line have been constructed as controllable elements, and condensers of variable capacitance, known as varicaps or varactor diodes, have been employed for this purpose.

An arrangement for delay equalization carried out in this manner only operates satisfactorily, however, as long as amplitude-dependent alterations of delay arising in the delay line as a result of changes in the amplitude of the signal itself do not play any significant part. While this is true for radar video signals and for black and white television signals, in the case of color television signals even very small amplitude-dependent phase shifts of the color distortions, known as differential phase distortion.

Another disadvantage of the known arrangement is that the range of alteration of the delay time is relatively small in comparison with the total delay time of the line. This has the result that the means delay time of the variable delay line must be substantially greater than the maximum value of the timing error to be compensated.

Finally, it is necessary in order to obtain a linear relation between the timing error and the delay time, that the control voltage for the variable capacitors shall be heavily predistorted (the voltage for altering the capacitance of the varicaps must rise in proportion to the fourth power of the error voltage obtained by phase comparison) which represent a further disadvantage of the known arrangement.

In co-pending patent application Ser. No. 400,866, now U.S. Patent No. 3,238,300, it has been proposed, in order to overcome these disadvantages to supplement a delay line including continuously variable capacitive or inductive elements by a number of delay lines with fixed delays connected in series, and to connect the individual delay lines in circuit or to short-circuit them as required under the control of the error voltage, by the interposition of an analogue/digital converter. The delays of the individual delay lines preferably form a geometrical progression. By the use of this arrangement amplitude-dependent alterations of delay are avoided in principle and the arrangement is therefore suitable without restriction even for compensating for timing errors in color television signals.

In the arrangement previously proposed, combinations of digital control voltages have been derived from the continuously varying error voltage in order to control the bridging-out or connecting in circuit of the individual delay lines arranged in the signal path as required. For this purpose an analogue/digital converter was employed for the conversion of the continuous error signal into discrete control voltages, as well as a matrix for obtaining the combinations of switching states appropriate to set up, by an appropriate combination of the individual delay times available in the individual lines, a delay time corresponding with the timing delay measured. This necessitates a considerable expense in order to obtain sufficiently close matching of the delay times. In addition, in order to obtain the necessary exact relationship between the selected switching conditions and the magnitude to the error voltage, the amplitude of the error voltage must be at all times accurately related to the timing error and the threshold levels in the analogue/digital converter must be maintained with great accuracy, which is in practice not wholly simple to achieve and further increases the cost of the apparatus.

In general, it is an object of the invention to provide a novel method of equalizing timing errors in signals containing periodic components.

It is a futher object of the invention to provide an apparatus for equalizing the variable time difference between two periodic signals, such as television signals.

It is a still further object of the invention to provide an apparatus for equalizing timing errors in a television signal derived from a magnetic tape recording equipment.

Apparatus according to the invention includes means for measuring the difference in timing between two periodic signals by counting elementary time intervals elapsing during the interval between like components of said signals, the number counted representing the magnitude of an error signal, and means for applying like components of said signals to control the delay time introduced into a signal path, in such a manner as to reduce the magnitude of said difference. The periods of oscillation of an electrical oscillation may advantageously be employed as the elementary time-intervals to be measured.

Apparatus according to the invention possesses the advantage that the digital control signal obtained in the manner described possesses an extraordinarily high accuracy. This is especially true when the periodic time of an electrical oscillation is employed as the elementary time-interval, since such an oscillation can be produced with very high temporal accuracy and constancy without any great difficulty. By the choice of the duration of the period of oscillation, that is, of the frequency of the electrical oscillation, the resolution of the measurement of the timing error and thus the compensation of this error may be effected with almost arbitrary accuracy.

The control voltages representing digital values which are thus obtained may be used directly, without further transformation, for the switching of the individual delay lines in accordance with the prior proposal set out above.

In a preferred embodiment of apparatus according to the invention the difference in timing is measured by means of a counter circuit which determines the number of electrical oscillations produced by an oscillator. In front of the counter is disposed a gate circuit which is opened by one of the signals to be compared and is closed by the other of these signals, In order that, at the subsequent opening of the gate, the counter will not add the result then obtained to that previously obtained, the couner is re-set to zero before the gate commences to open. To prevent the delay time returning to its minimum value at each re-setting of the counter, as would occur were the control direct an intermediate store is provided to which the result of the count is supplied after the end of each counting operation and the setting of which is merely corrected if necessary by each subsequent of a counting operation. The result of a count stored in the intermediate store thus follows only the alterations in the time differences between the signals being compared.

Apparatus according to the invention will now be further described with reference to the accompanying drawings, which shows a block circuit diagram of one embodiment of apparatus according to the invention.

In the drawing, 1 denotes a device for the central control of the working sequence, to which the two signals to be compared are applied. A train of line-frequency synchronizing signals from a television master impulse generator may be applied to device 1 by way of a lead 2 and a complete composite television signal derived from a magnetic tape recording equipment may be applied to device 1 by way of a lead 3. The signals applied to device 1 are arranged to control a gate circuit 4, to which is applied from an oscillator 5 a constant-frequency signal having a periodic time $t_0$. The gate circuit 4 is opened by one of the applied signals, in point of fact by that signal in which a synchronizing impulse first appears, and is closed by the other applied signal, in which the synchronizing signal appears at a later time. Thus the gate circuit allows the oscillatory signal supplied by oscillator 5 to pass only during the interval of time between the leading edges of the synchronizing impulses in the two signals, so that the number of oscillations of period $t_0$ which pass through the gate is a measure of the difference in timing between the two signals.

The number of oscillations which are allowed to pass through the gate 4 is now counted by means of a counter including successive counter stages 11, 12, 13, 14 and 15. In the simplest case the counter is constructed as a binary counter, so that each alternate impulse applied to a counter stage causes the next subsequent stage to be reversed. With five stages I . . . V as in the present example, a maximum of 32 periods of oscillation can therefore be counted. If the period time $t_0$ of the oscillator has, for example, a duration of 30 nanoseconds, corresponding to an oscillator frequency of some 30 mc./s., timing errors up to some 1 $\mu$sec. can be compensated with an accuracy within the permissible tolerance.

With each of counter stages 11–15 there are associated corresponding switching devices 21–25 which when a counting operation is complete are closed to connect each of the individual counter stages to corresponding stages 31–35 in the intermediate store. Each stage of the intermediate store comprises a bistable trigger which is thus set into and remains in the condition of the associated counter stage. Subsequently, the connections between the counter stages 11–15 and the stages 31–35 of the intermediate store are broken by opening the switches 21–25 and the counter stages are re-set to zero, by a signal from the central control device 1, before beginning of the subsequent counting period.

Thus the number of oscillations from the oscillator which are allowed to pass by the gate circuit 4 during the time-intervals between corresponding events in the two signals being compared is retained in the store 31–35 and is readjusted as necessary in accordance with the result of each subsequent count.

Each counter stage of the binary counter is associated by way of the appropriate store with an individual one of delay lines 51–55, the delays of which increase from each to the next in accordance with a geometric progression with common ratio 2. The delay time of the first line 51 corresponds to the smallest time-difference $T_L$ which is to be compensated. The second line 52 thus has a delay of $2T_L$, line 53 has a delay of $4T_L$ line 54 a delay of $8T_L$ and line 55 a delay of $16T_L$. In accordance with the settings of the counter stages the appropriate delay lines 51–55 are switched into the signal path under the control of associated control stages 41–45, or are replaced by signal paths 61–65 with zero delay times.

The signal of which the delay time is to be compensated, in the present example the television signal BAS received by way of lead 3, is now delayed by a series connected chain of delay lines 51–55 so that it agrees in timing with the reference signal received over lead 2 with a residual error of which the maximum value is equal to the elementary delay time $T_L$.

As already explained earlier, the resolution of the time measurement, and thus the equalization of the timing error can be effected so accurately, by the choice of a high oscillator frequency, that any further delay equalization, such as was as a rule necessary in order to obtain the necessary accuracy of phasing of the color sub-carrier in an NTSC color-television signal derived from a magnetic tape signal recorder, becomes unnecessary. Owing to the extraordinarily short time required for the measurement and for the equalization of the error it is also possible in the case of television signals to effect the delay equalization during the period of the front porch in the horizontal blanking interval, so that even the leading edge of the horizontal synchronizing signal is corrected. It is also possible to pass the corrected signal through other apparatus operating in accordance with the invention and thus to reduce the residual error to an arbitrarily small amount.

The invention is not limited to the specific embodiment described above, but can with advantage be employed to compensate for timing errors in any periodic electrical signals.

While the principles of the present invention have been described above in connection with specific apparatus, it is to be clearly understood that this description is made only by way of example and not as limitation to the scope of the invention.

What is claimed and desired to be secured by Letters Patent is:

1. A method of equalizing timing errors in an initial signal containing a nominally periodically repetitive component said component being subject to timing errors, said method comprising the steps of: developing said initial signal containing said repetitive component; developing a reference signal containing a component truly repetitive with said periodicity; developing a digital error signal representing a measure of the difference in timing between corresponding elements of said signal components in said initial and further signals; providing a signal path having a controllable delay; applying said error signal to control said delay; and transmitting said initial signal through said signal path to yield a signal in which said timing errors are equalized.

2. Apparatus for equalizing timing errors in an initial signal containing a nominally periodically repetitive component said component being subject to timing errors comprising in combination: a source of said initial signals; a source of a reference signal including a component truly repetitive at said periodicity; comparator means operable to develop a digital error signal representing the difference in timing between corresponding elements of applied signals; means applying signals from each said source to said comparator means; variable delay means operable by an applied digital signal to introduce correspondingly varied delay into a signal path; means applying said error signal to control said delay means; and means transmitting said initial signal through said signal path to yield a signal in which said timing errors are equalized.

3. Apparatus according to claim 2, in which said comparator means comprises, in combination: a gate circuit actuable by a first applied signal to permit the passage of a second applied signal and actuated by a third applied signal to inhibit the passage of said second signal; a source of a timing signal including a component periodically repetitive at a periodicity high in comparison with first said periodicity; means applying said repetitive component of said initial signal to said gate circuit as said first signal; means applying said timing signal to said gate circuit as said second signal; and means applying said repetitive component of said reference signal to said gate circuit as said third signal; portions of said timing signal passing through said gate circuit constituting said digital error signal.

4. Apparatus according to claim 2, in which said variable delay means comprises, in combination: a multi-stage counter circuit; means applying said digital error signal to said counter circuit; individual switch operable by applied potentials, each said switch means when operated introducing into a signal path a signal delay of predetermined duration; and an individual connection from each said stage of said counter circuit applying to said switch means controlling a signal delay corresponding with the magnitude of the error represented by an error signal causing said counter stage to be actuated to produce a switch-controlling potential.

5. Apparatus according to claim 2, in which said variable delay means comprises a counter fed with said digital error signal, individual stages of said counter controlling the introduction into a signal path of corresponding signal delays; and including also means operable by an applied pulse signal to restore said counter to a predetermined condition; a source of pulse signals predeterminedly related in time to said repetitive component of said initial signal; and means applying said pulse signals to restore said counter to said predetermined condition.

6. Apparatus for equalizing timing errors in an initial signal containing a component nominally repetitive at a predetermined periodicity, said component being subject to timing errors, comprising in combination: a source of said initial signal; a source of a reference signal including a component repetitive at said periodicity; a source of timing signals repetitive at a second periodicity high compared with first said periodicity; a gate circuit actuable by a first applied signal to permit the passage of a second applied signal and actuable by a third applied signal to inhibit the passage of said second signal; means applying said repetitive component of said initial signal to said gate circuit as said first signal; means applying said timing signal to said gate circuit as said second signal; and means applying said repetitive component of said reference signal to said gate circuit as said third signal; a counter circuit including a plurality of stages operable by applied digital signals to distinct combinations of conditions each representing an integer; a plurality of switch means individually operable by an applied potential, said switch means when operated acting to introduce into a signal path a delay corresponding to a timing error represented by a said integer; a like plurality of storage means each operating to retain and supply an applied potential; individual connections from each stage of said counter to an individual one of said storage means and individual connections from each said storage means to a corresponding one of said switch means; and means transmitting said initial signal through said signal path to yield a signal in which said timing errors are equalized.

7. Apparatus according to claim 6, in which said counter circuit counts in the binary scale and in which said switch means individually introduce into said signal path delays of which the values form a geometric progression having a common factor of two.

References Cited

UNITED STATES PATENTS 3,324,397 6/1967 Harvey -------------- 178—6.6

ROBERT L. GRIFFIN, *Primary Examiner.*

H. W. BRITTON, *Assistant Examiner.*

U.S. Cl. X.R.

178—6.6; 179—100.2